3,491,032
HIGH DENSITY POLYOLEFIN FOAMS
Richard E. Skochdopole and Louis C. Rubens, Midland, Mich., assignors to The Dow Chemical Company, Midland, Mich., a corporation of Delaware
No Drawing. Filed Sept. 2, 1964, Ser. No. 394,059
Int. Cl. C08f 47/08
U.S. Cl. 260—2.5      6 Claims

ABSTRACT OF THE DISCLOSURE

High density foams produced by foaming a homogeneous composition of a molten thermoplastic aliphatic olefinic polymer and perfluorocyclobutane, perfluoropropane, chlorohexafluoropropane, chloroheptafluoropropane, perfluorocyclopropane or perfluorobutane under pressure and subsequently releasing the mixture to a zone of lower pressure thereby expanding the composition.

---

This invention relates to a process for making cellular polymer materials. More particularly, it relates to a method employing certain volatile organic compounds as foaming agents for making fine-celled, high-density olefin polymer bodies.

In preparing cellular bodies from thermoplastic resins it is common practice to incorporate in the material to be foamed or expanded a solid decomposable blowing agent, which, under the influence of heat, evolves gas, thus causing the formation of numerous cells which impart a lowered density to the finished product. It is known to incorporate a gas or volatile organic liquid into a thermoplastic resin and heat the latter to a temperature at which it becomes plastic whereby vapors of the gas or volatile liquid expand the softened resin to form a cellular mass.

U.S. Patent 2,387,730 teaches a method for making cellular polyethylene by impregnating the molten polymer with a gas which is soluble therein under pressure, thereafter partially releasing the pressure while maintaining the temperature to expand the polyethylene, and finally cooling the expanded polymer.

The heretofore known methods for making cellular bodies from normally solid aliphatic olefin polymers, e.g. polyethylene, have not been entirely satisfactory because of the type of blowing agent employed and also because the heretofore known methods are difficult to control to produce cellular masses composed of uniform small cells. Although attempts to produce high density foams have been successful, foamed bodies have only been produced by using solid decomposable blowing agents. The disadvantages of the latter procedure are that the presence of non-volatile residues from the blowing agent hinders the electrical properties of the foamed product and it is difficult to disperse the solid blowing agent uniformly throughout the polymer to produce a uniform cell structure. It would therefore be highly desirable to provide a process whereby fine-celled, high density foams could be produced by using gaseous-type blowing agents.

It is an object of the present invention to provide a process for producing improved cellular bodies from thermoplastic olefin polymers. It is another object to provide a process for producing cellular masses having fine cells. A more specific object is to provide high-density cellular masses having uniform fine cells by means of employing volatile gaseous foaming agents. These and other objects, advantages, features and variations will become apparent from the following description.

In accordance with the present invention, the above and other objects are attained by forming a homogeneous flowable composition of a heat-plastified or molten thermoplastic polymer of one or more olefin polymers and perfluorocyclobutane, perfluoropropane, chlorohexafluoropropane, chloroheptafluoropropane, perfluorocyclopropane or perfluorobutane, under pressure and releasing said composition into a zone of sufficiently lower pressure to cause expansion of said composition to form a high density, fine-celled polymer body. The foaming agent is present in an amount from about 0.5 percent to about 20 percent and preferably from about 1 percent to about 7 percent by weight based on the weight of the total mixture.

The term "high density" as used herein describes expanded polymer bodies having a density greater than 6 lbs. per cubic foot. Such polymer bodies have better physical properties and thereby increase the utility of the polymer for a greater variety of applications.

The term "fine-celled" as used herein refers to expanded polymer bodies having a cell size of less than 100 microns in diameter.

In a preferred practice for making a cellular olefin polymer body in a continuous manner, the normally solid polymer, e.g. polyethylene, suitably in granular form, is fed to a plastic extruder wherein it is heat-plastified and blended with a volatile organic blowing agent such as perfluorocyclobutane under pressure in the desired proportion to form a homogeneous flowable composition, which composition is brought to a substantially uniform temperature between about 90° and 200° C. throughout its mass. The plastic material is thereafter extruded or discharged through a suitable orifice into a zone of lower pressure, e.g. the atmosphere, wherein the extruded material expands to form a cellular body which cellular body is cooled and prepared by suitable means for convenient handling. The blowing agent may also be mixed into the polymer prior to extrusion and blowing agent-laden particles can be fed directly to an extruder instead of mixing the blowing agent into the polymer in the extruder as described above.

The polymers to be employed in making the cellular products by the process of the invention can be normally solid olefin polymers obtained by polymerizing aliphatic monoolefins such as ethylene, propylene, butene-1, pentene-1, 3-methylbutene-1, 4-methylpentene-1, 4-methylhexene-1 or 5-methylhexene-1, alone, with one another, or with various other polymerizable compounds, but the polymers of ethylene or propylene alone are preferred because they produce tough, resilient, fine-celled, chemically inert products. Examples of suitable polymerizable organic compounds which can be copolymerized with ethylene or propylene are vinyl acetate, styrene, methyl methacrylate, tetra-fluoroethylene, acrylonitrile and the like. Copolymers containing in chemically combined form a predominant amount, e.g. 70 percent by weight or more, of ethylene or propylene with not more than 30 percent of one or more of such other polymerizable compounds can be used. The olefin polymers can be modified by blending with polymeric materials, e.g. acrylonitrile butadiene rubbers, poly(2 - chlorobutadiene-1,3), polyisoprene or ethylene-vinyl acetate copolymers. Halogenated aliphatic olefin polymers can also be used.

The polymer-foaming agent gel is preferably extruded at a temperature near or above the melting point of the olefin polymer, but higher or lower temperatures can be used. The temperature at which the gel is extruded into a zone of lower pressure will vary depending in part upon the size and arrangement of the apparatus employed, the rate of extrusion of the gel, the melting point of the olefin polymer and the proportions of the polymer and the particular foaming agent employed. The gel should be subjected to a pressure of at least 400 p.s.i.

In general, the gel can be extruded at a temperature of from about 10° C. below to a temperature of about 30° C. above the melting point of the polymer. The gel is preferably extruded at a temperature in the range from about 5° C. to about 25° C. above the melting point of the polymer-foaming agent gel.

The invention provides an improved and economical method for making cellular masses from olefin polymers, which cellular material is useful for a variety of purposes, e.g. wire coatings, gasketing, packaging, clothing, and the like. The products possess a highly uniform fine-cell structure consisting for the most part of thin-walled individually closed cells.

Finely divided solid materials such as calcium silicate, zinc stearate, magnesium stearate and the like can advantageously be incorporated with the polymer or gel prior to expanding the same. Such finely divided materials aid in controlling the size of the cells, and are employed in amounts of from about 0.01 percent to about 2.0 percent by weight of the polymer.

The following examples are illustrative of the present invention but are not intended to limit the scope thereof.

EXAMPLE 1

Sixteen grams of polyethylene molding granules of M.I. 2 and 10 cc. of perfluorocyclobutane were sealed in a 45 cc. glass ampoule. The sealed ampoule was heated in an oil bath at 120° C. for 2 hours, removed and immediately broken by driving said ampoule against a steel plate by means of air pressure. The polyethylene expanded to 6 times its original volume, which is equivalent to a density of about 10.4 lbs. per cubic foot, and had cells whose size was in the range of 20–50 microns in diameter.

EXAMPLE 2

The procedure described in Example 1 was substantially repeated except that chlorohexafluoropropane was substituted for perfluorocyclobutane as the foaming agent. The polyethylene expanded to 5.5 times its original volume or an equivalent density of about 11.3 lbs. per cubic foot and had cells whose size was in the range of 20–50 microns in diameter.

EXAMPLE 3

Ten grams of commercial grade polypropylene pellets were placed with varying amounts of perfluorocyclobutane into several 40 cc. glass ampoules. The ampoules were sealed, heated to 120° C. for 4 hours to allow permeation of an equilibrium amount of foaming agent throughout the polymer, heated again to 165° C., equilibrated for 30 minutes and fractured according to the procedure described in Example 1. The results of the tests are shown in Table I.

TABLE I

| Test: | cc. Foaming agent charged, perfluorocyclobutane | Ratio of final volume to initial volume | Cell size (mm.) | General appearance |
|---|---|---|---|---|
| 1 | 0.5 | 1.0 | | No foaming. |
| 2 | 1.0 | 1.0 | | Do. |
| 3 | 2.0 | 1.0 | | Do. |
| 4 | 3.0 | 1.09 | .01 | 50–75% foamed. |
| 5 | 5.0 | 1.16 | .01 | 100% foamed. |
| 6 | 10.0 | 1.47 | .001 | Do. |

EXAMPLE 4

The procedure of Example 3 was substantially repeated except that perfluoropropane was substituted as the foaming agent. The results are shown in Table II.

TABLE II

| Test: | cc. Foaming agent charged, perfluoropropane | Ratio of Final volume to initial volume | Cell size (mm.) | General appearance |
|---|---|---|---|---|
| 7 | 0.5 | 1.0 | | No foaming. |
| 8 | 1.0 | 1.0 | | Few foamed specks. |
| 9 | 2.0 | | .01–.10 | Most foamed. |
| 10 | 3.0 | 2.2 | .01–.10 | 100% foamed. |
| 11 | 5.0 | 3.4 | .01 | Do. |
| 12 | 10.0 | 4.0 | .01 | Do. |

Example 3, Tests 4–6, and Example 4, Tests 9–12, produced high density fine-celled foams.

EXAMPLE 5

In a comparative test not exemplary of the present invention, the procedure of Example 3 was substantially repeated except that dichlorotetrafluoroethane, a prior art foaming agent, was used. The results in Table III show that although relatively fine-celled foams can be obtained, the ratio of final to initial volume indicates that a low density foam is produced.

TABLE III

| Test: | cc. Foaming agent charged, dichlorotetrafluoroethane | Ratio of final volume to initial volume | Cell size (mm.) | General appearance |
|---|---|---|---|---|
| 13 | 0.5 | 1.0 | | No foaming. |
| 14 | 1.0 | 1.0 | | Do. |
| 15 | 2.0 | 1.0 | | Some specks. |
| 16 | 3.0 | 18.0 | .05–1.0 | 100% foamed. |
| 17 | 5.0 | 29.0 | .2–.3 | Do. |
| 18 | 10.0 | 69.0 | .05–.10 | Do. |

EXAMPLE 6

One pound of high density polypropylene (Melt Index 2.0, Density .920) was blended with 2.25 grams of finely divided iron oxide in a Banbury mixer for 15 minutes. The iron oxide was employed as the nucleating agent. The resulting blend was placed in a 1.40 liter pressure vessel together with 1 lb. of perfluorocyclobutane for 16 hours in an oil bath maintained at 140° C. The pressure vessel was cooled to room temperature and the excess perfluorocyclobutane vented to the atmosphere. The polymer contained about 3.12 percent by weight of foaming agent.

The polymer blend was placed in an extruder and extruder through a 2-hole 87.5 mil die at a gel temperature of about 179° C. The emerging polymer expanded to form a foamed polymer product having fine, uniform cells in the range from about 57 microns to about 100 microns in diameter and a foam volume of about 2.24 times the original volume of the non-expanded polymer, i.e., a density of about 27.8 pounds per cubic foot.

EXAMPLE 7

The procedure as described in Example 6 was substantially repeated except that 1 lb. of high density polyethylene (Density .960) was employed as the polymer and 1.98 grams of citric acid and 1.71 grams of sodium bicarbonate were added as nucleating agents. The polymer mixture was extruded at a temperature of about 200° C. The resulting foamed product contained fine, uniform cells in the range from about 70 microns to about 88 microns in diameter and a foam volume of about 1.79 times the original volume of the non-expanded polymer.

In all of the above examples of the present invention, an excess of foaming agent was added to the polymer to obtain a polymer-foaming agent gel containing said foaming agent in an amount from about 0.5 percent to about 20 percent by weight based on the total weight of the mixture.

What is claimed is:

1. A process for producing high density foamed products from olefin polymers which comprises forming a homogeneous composition of a molten thermoplastic aliphatic olefin polymer and a volatile organic foaming agent selected from the group consisting of perfluorocyclobutane, perfluoropropane, chlorohexafluoropropane, chloroheptafluoropropane, perfluorocyclopropane and perfluorobutane, forming said composition under a pressure of at least 400 p.s.i. and subsequently releasing the composition to a zone of lower pressure causing expansion of said composition to form a high density, fine-celled polymer body.

2. The process according to claim 1 wherein the olefin polymer is polyethylene.

3. The process according to claim 1 wherein the olefin polymer is polypropylene.

4. The process according to claim 1 wherein the volatile organic foaming agent is present in an amount from about .5 percent to about 20 percent by weight based on the total weight of the mixture.

5. A process for producing high density foamed olefin polymers which comprises forming under pressure of at least 400 p.s.i. a homogeneous flowable composition of molten polyethylene and a volatile organic foaming agent selected from the group consisting of perfluorocyclobutane, perfluoropropane, chlorohexafluoropropane, chloroheptafluoropropane, perfluorocyclopropane, and perfluorobutane, releasing the mixture to a zone of lower pressure causing the above composition to expand and form a high density, fine-celled polyethylene composition.

6. A process for producing high density foamed olefin polymers which comprises forming under pressure of at least 400 p.s.i., a homogeneous composition of molten polypropylene and a volatile organic foaming agent selected from the group consisting of perfluorocyclobutane, perfluoropropane, chlorohexafluoropropane, chloroheptafluoropropane, perfluorocyclopropane and perfluorobutane, releasing the mixture to a zone of lower pressure causing the above composition to expand and form a high density, fine-celled foamed polypropylene composition.

References Cited

UNITED STATES PATENTS

| | | |
|---|---|---|
| 2,848,428 | 8/1958 | Rubens. |
| 3,067,147 | 12/1962 | Rubens et al. |
| 3,375,211 | 3/1968 | Parrish _____ 260—2.5 |

MURRAY TILLMAN, Primary Examiner

W. J. BRIGGS, SR., Assistant Examiner

U.S. Cl. X.R.

264—51, 53

PO-1050
(5/69)

UNITED STATES PATENT OFFICE
CERTIFICATE OF CORRECTION

Patent No. 3,491,032            Dated January 20, 1970

Inventor(s) Richard E. Skochdopole and Louis C. Rubens

It is certified that error appears in the above-identified patent and that said Letters Patent are hereby corrected as shown below:

In Col. 5, line 11, delete "forming said composition".

SIGNED AND
SEALED
JUN 30 1970

(SEAL)
Attest:

Edward M. Fletcher, Jr.
Attesting Officer

WILLIAM E. SCHUYLER, JR.
Commissioner of Patents